United States Patent [19]

Fogarty et al.

[11] Patent Number: 4,884,225
[45] Date of Patent: Nov. 28, 1989

[54] FILTERING IN 3-D VISUAL SYSTEM

[75] Inventors: Kevin E. Fogarty, Mass.; Fredric S. Fay, both of Worcester; Louise M. Isenstein, Littleton, all of Mass.; James M. Coggins, Chapel Hill, N.C.

[73] Assignee: University of Massachusetts Medical Center, Worcester, Mass.

[21] Appl. No.: 34,893

[22] Filed: Apr. 3, 1987

[51] Int. Cl.⁴ .................... G06F 15/42; G06F 15/70
[52] U.S. Cl. ............................. 364/559; 364/413.13; 364/413.26; 364/572; 382/6; 382/42
[58] Field of Search ............... 364/414, 525, 559, 572, 364/728, 413.26, 413.13; 382/6, 42; 356/417, 418

[56] References Cited

U.S. PATENT DOCUMENTS

| | | | |
|---|---|---|---|
| 4,360,885 | 11/1982 | Edgar | 364/525 |
| 4,672,562 | 6/1987 | Egli et al. | 364/559 |
| 4,724,543 | 2/1988 | Klevecz et al. | 382/6 |
| 4,744,667 | 5/1988 | Fay et al. | 356/417 |

OTHER PUBLICATIONS

Fredric . Fay, Kevin E. Fogarty and James M. Coggins, "Analysis of Molecular Distribution in Single Cells Using a Digital Image Microscope", *Optical Methods in Cell Phsiology*, P. De Weer and B. Salzberg, Editors, John Wiley & Sons, (New York), May 7, 1986.

"Distribution of α Actinin in Single Isolated Smooth Muscle Cells", F. S. Fay, K. Fujiwara, D. D. Rees, and K. E. Fogarty, *The Journal of Cell Biology*, vol. 96, Mar. 1983, pp. 783-795.

"Development and Application of a Three-Dimensional Artificial Visual System", James M. Coggins, Kevin E. Fogarty and Frederic S. Fay, Proceedings of the Ninth Annual Symposium on Computer Applications in Medical Care, Nov. 10-13, 1985, pp. 686-690.

"Development and Application of a Three-Dimension Artificial Visual System", James M. Coggins, Frederic S. Fay and Kevin E. Fogarty, *Computer Methods and Programs in Bio-Medicine*, 22(1986), pp. 69-77.

"Texture Analysis Based on Filtering Properties of the Human Visual System", 1981 International Conference on Systems, Man and Cybernetics, Atlanta, Ga., pp. 112-117, Captain Arthur P. Ginsburg, James M. Coggins.

"A Framework for Texture Analysis Based on Spatial Filtering", James M. Coggins, Michigan State University Dissertation, Department of Computer Science, 1982, pertinent pages.

"A Spatial Filtering Approach to Texture Analysis", James M. Coggins, Anil K. Jain, *Pattern Recognition Letters*, 3(1985), pp. 195-203.

"Printed Character Recognition Using an Artificial Visual System", James M. Coggins, John T. Poole, Proceedings of the International Conference on Cybernetics and Society, Atlanta, Ga., 1986, pp. 1612-1616.

*Primary Examiner*—Parshotam S. Lall
*Assistant Examiner*—Kevin J. Teska
*Attorney, Agent, or Firm*—Hamilton, Brook, Smith & Reynolds

[57] ABSTRACT

A series of spacial filters are used in a convolution process to determine location, size and orientation of bodies in an image. One series of spacial filters of different sizes is used to determine location and size. A second series is used to determine orientation and is a series of varying density, overlapping spacial filters. In particular, the series of spacial filters determines the spherical coordinants (r, θ, φ) of bodies in an image of a muscle cell. The series of overlapping filters in one design have vector responses such that a resultant vector is defined. φ equals the angle of the resultant vector and θ is proportional to the length of the resultant vector. A series of one and two dimensional differential gaussian filters determine the cell boundaries.

22 Claims, 6 Drawing Sheets

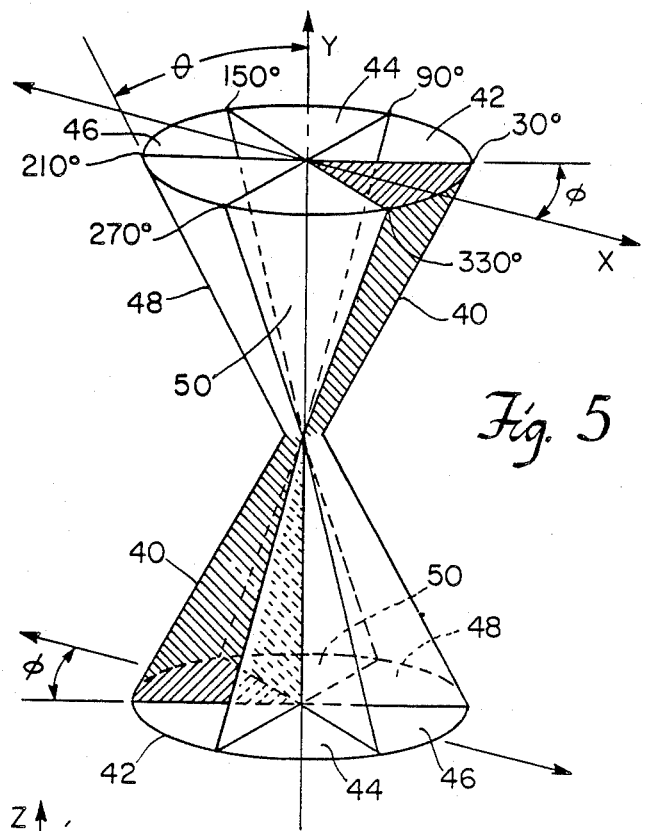
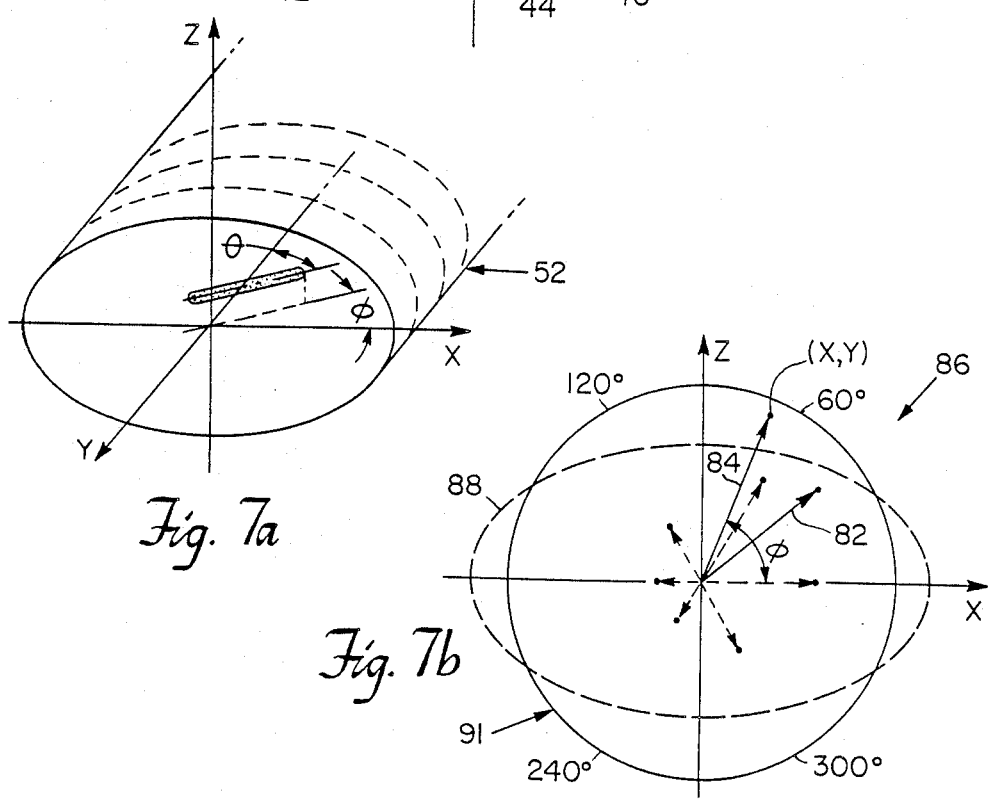
Fig. 5
Fig. 7a
Fig. 7b

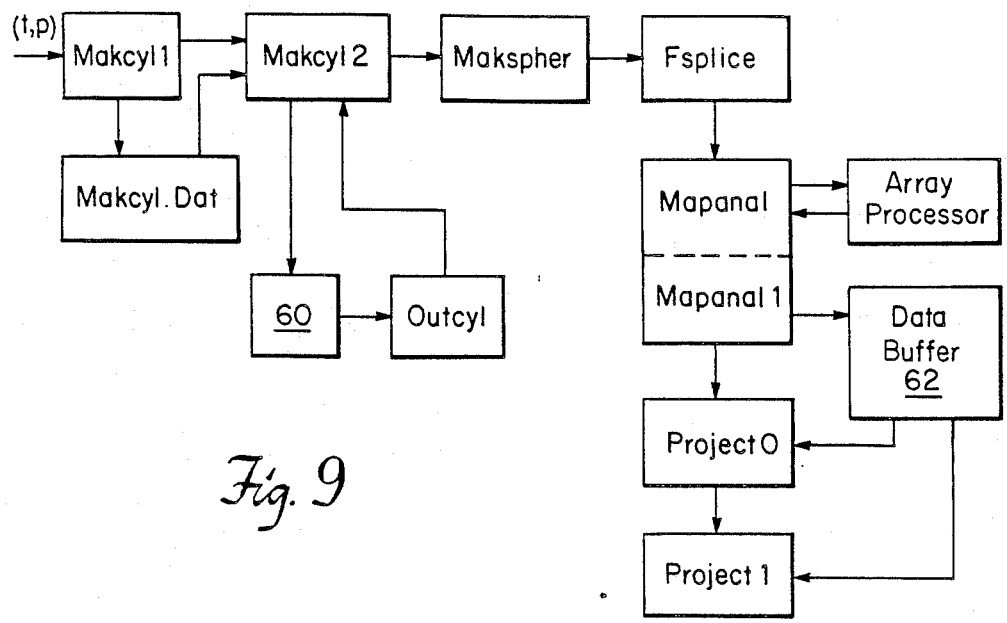
*Fig. 9*
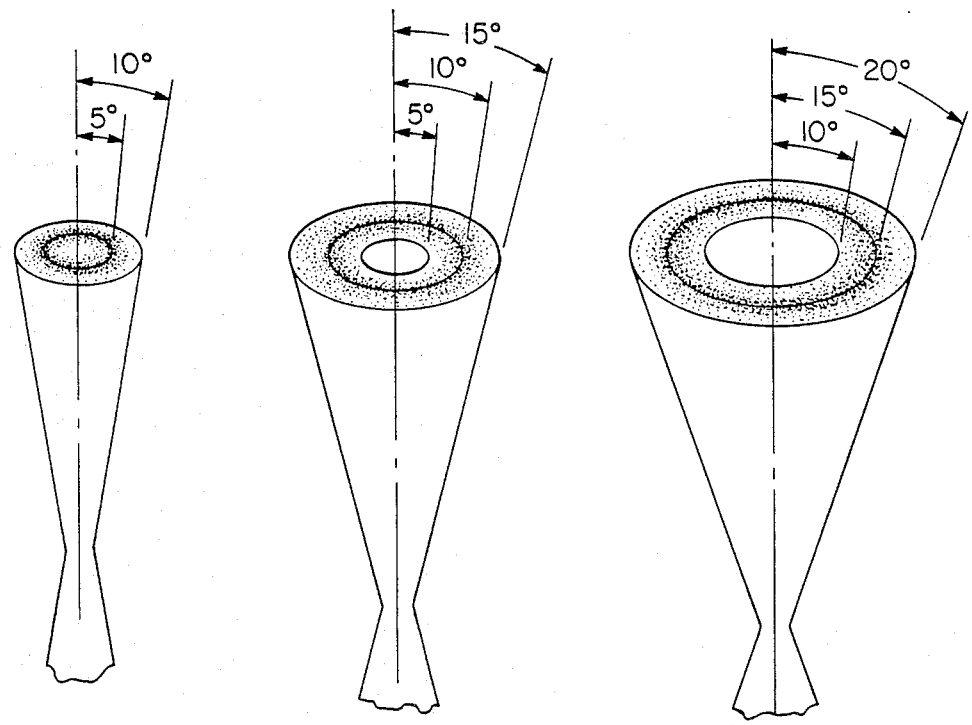
*Fig. 10a*   *Fig. 10b*   *Fig. 10c*

FILTERING IN 3-D VISUAL SYSTEM

RELATED PUBLICATIONS

Incorporated herein by reference are the following publications.

Coggins, James M., Fogarty, Kevin E. and Fay, Frederic S., Development and Application of a Three-Dimensional Artificial Visual System. Reprinted from Proceedings of the Ninth Annual Symposium on Computer Applications in Medical Care, November, 1985 pp 686-690.

Coggins, James M., Fogarty, Kevin E. and Fay, Frederic S., Development and application of a three-dimensional artificial visual system. Elsevier Science Publishers, Computer Methods and Programs in Biomedicine 22(1986) 69-77.

Fay, Fredric S., Fogarty, Kevin E. and Coggins, James M., Analysis of Molecular Distribution in Single Cells Using a Digital Imaging Microscope. In Optical Methods in Cell Physiology, P. De Weer and B. Salzberg, eds., John Wiley & Sons, (New York), May. 7, 1986.

BACKGROUND OF THE INVENTION

The contractile mechanism in striated muscle cells is fairly well understood; strands of proteins (actin and myosin) are anchored by structures called z-disks that are rich in the protein α-actinin. During contraction, the protein strands slide relative to each other, exerting force against the z-disks and thereby contracting the cell.

The contractile mechanism of smooth muscle cells is not well understood. Smooth muscle cells lack the striations and z-disks of striated muscle cells, but do contain discrete bodies rich in actinin and strands of myosin and actin. These proteins are presumed to interact in smooth muscle cells as they interact in striated muscle cells, but this notion has not been verified, partly because of the difficulty of identifying long-range structural patterns in the placement of the actinin bodies, which do not appear to be ordered in any two-dimensional image.

It is known, however, that α-actinin is distributed through the cell in two types of discrete bodies of concentration: irregular plaques attached to the cell membrane, and small oblong bodies in cytoplasm just outside the nucleus of the cell. Some fluorescence images suggest that the oblong dense bodies occur in regular strands twisting through the cell in three dimensions. Since these oblong bodies apparently serve to anchor filaments of actin along the lines of force in the cell, the positions and orientations of the α-actinin bodies provide clues regarding how force is generated and transmitted through the cell.

Electron micrographs have been used to view some dense bodies, but the images do not provide enough information to discern long-range three-dimensional organization. Also, the cells must be fixed before making electron micrographs, and it is desirable to develop an imaging method that could be used on living cells.

Fluorescence digital imaging microscopy has been used to obtain an image of the α-actinin dense bodies in either living or fixed cells. In the fluorescence imaging system developed by the present applicant disclosed in "Analysis of Molecular Distribution in Singel Cells Using a Digital Imaging Microscope" by Fredric S. Fay, Kevin E. Fogarty and James M. Coggins and in U.S. patent application Ser. No. 07/034,777 filed on even date herewith (and now pending as File Wrapper Continuation Application Ser. No. 07/204,931, filed on May 31, 1988) entitled "Imaging Microspectrofluorimeter", fluorescence labelled antibodies specific to actinin are introduced into Light of a particular frequency is then introduced to the cell and the fluorescence labelled dense bodies are illuminated. Fluorescence images of the illuminated bodies are acquired in two-dimensional planes by optical sectioning. Three-dimensional information is thereafter obtained by a grouping process of the optical sectioning. The three-dimensional image data is preprocessed to minimize image noise, nonuniformities in the optical system's gain, and distortion due to the optical system.

However, there is a problem of locating in the three-dimensional image all of the actinin dense bodies and determining the orientation of the oblong bodies. The oblong dense bodies are one voxel wide and about five voxels long (corresponding to a width of 0.25 $\mu m$ and a length of 1.25 $\mu m$). The long axes of oblong bodies have been observed to lie within 30° of the long axis of relaxed cells.

Attempts to locate and determine orientations of the bodies by visual inspection of the image planes proved impractical because of the large number of bodies and because of the difficulty of correlating traces of obliquely oriented bodies through multiple image planes in the presence of noise and distortion. A smudge in one plane could indicate a dense body, an out-of-focus structure from a nearby image plane, or a "hot spot" of fluorescence unrelated to the dense bodies being sought. Nevertheless, one cell was manually processed, giving positions and limited orientation data on the bodies. The data was used to create a rotating graphic model viewable from a fixed point in space but it proved too awkward for the level of interaction desired. Stereo images created by solid modelling of the 3-D image proved too abstract for stereopsis to be effective, and occlusion of data was a serious problem.

SUMMARY OF THE INVENTION

An object of the present invention is to provide an artificial visual system to simplify the 3-D image data and to enable interactive graphics capabilities for physiological analysis and for more general applications.

A further object of the present invention is to provide an artificial visual system for locating position and size of dense bodies in an image of a cell.

A system embodying the present invention comprises a series of spacial filters which locate the positions of bodies of different predetermined ranges of sizes and orientation in an image. Each filter is convolved with the image and locates bodies of at least a predetermined size. In a preferred embodiment, the spacial filters locate dense oblong molecular bodies in a 3-D image of a cell. In that case, each spacial filter is a set of two cones positioned nose to nose and detects elongated bodies of a particular length within a predetermined range of orientations. The nose to nose cones are generated by a summing of the area swept by a cylinder of the particular length rotated about its center through the predetermined range of orientations. The convolution of these filters with the image generates local maximum responses where the volume of the filter is substantially intersected by a body. The local maximum responses provide the locations of bodies and potential body center sites.

In accordance with another aspect of the present invention, a series of spacial filters determines spacial characteristics of bodies in an image. The series of spacial filters are designed such that each successive filter provides a principal response to bodies of incremental values of spacial characteristics but also provides a convolution response to other bodies over a range of values of the spacial characteristics above and below the incremental values. The range of values of successive filters overlap each other to provide a unique convolution response to determine the spacial characteristics of bodies at values other than the incremental values.

In a preferred embodiment, a series of overlapping spacial filters determines an azimuthal angle of orientation of the bodies in the image. Each filter in the series of overlapping spacial filters comprises diagonally corresponding pie-shaped segments of two cones positioned nose to nose. Each pair of corresponding pie-shaped segments, and therefore each spacial filter, covers a 120° range of azimuthal angles and has a principle response to bodies having azimuthal angles at an increment of 60°.

The series of spacial filters determines an azimuthal angle and a declination angle with respect to the longitudinal axis of the image. The azimuthal angle $\phi$ is defined as a sum of the responses of each overlapping spacial filter. The declination angle is proportional to the length of the resultant vector.

In another embodiment of the present invention, weighted vector responses of the spacial filters are used to compensate for optic distortion in the depth of the image. In this embodiment, the vector responses of the spacial filters which have a component along the depth axis of the image are amplified by an eccentricity value which corrects the depth distortion of the image. The amplified vector responses are then summed to define the azimuthal angle of the body, and the length of the resultant vector is proportional to the declination angle of the body.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being place upon illustrating the principles of the invention.

FIG. 5 is a side view of a series of P-filters which are derived from the R-filters of FIG. 2b.

FIG. 7a is an illustration of a resulting elliptical view of the cell due to the depth distortion of the optics in the fluorescence imaging system.

FIG. 7b is an illustration of circular averaging of the P-filter responses for one body.

FIG. 9 is a flow chart of a computer program which accomplishes the spacial filtering of the image with R and P filters embodying the present invention.

FIGS. 10 through 10c illustrate a series of T-filters derived from the R-filters of FIG. 2b.

DETAILED DESCRIPTION OF THE INVENTION

In general, an artificial visual system (AVS) is a set of spatial filters and a recombination algorithm that maps the filter outputs into a feature plane or representation space. The spacial filters decompose an image into separate bands of information so that pertinent information is more easily recognized. In the study of smooth muscle cells, the filters are designed to yield information concerning location, size and orientation of dense bodies within a muscle cell. In addition, a priori knowledge about the dense bodies is incorporated into the filter design to enhance the sensitivity and the efficiency of the analysis. Fourier transforms are performed on the filters and image data, and the filters are convolved with an image of the cell in the frequency domain. The the inverse transforms of the responses of the filters from this convolution are used to determine location, size and orientation of the bodies within the cell. The obtained information is processed in a recombination algorithm which projects the data onto a feature plane. The results from the planar projection are used for further analysis of the smooth muscle cell using computer graphics.

Figures 1A, 1B:
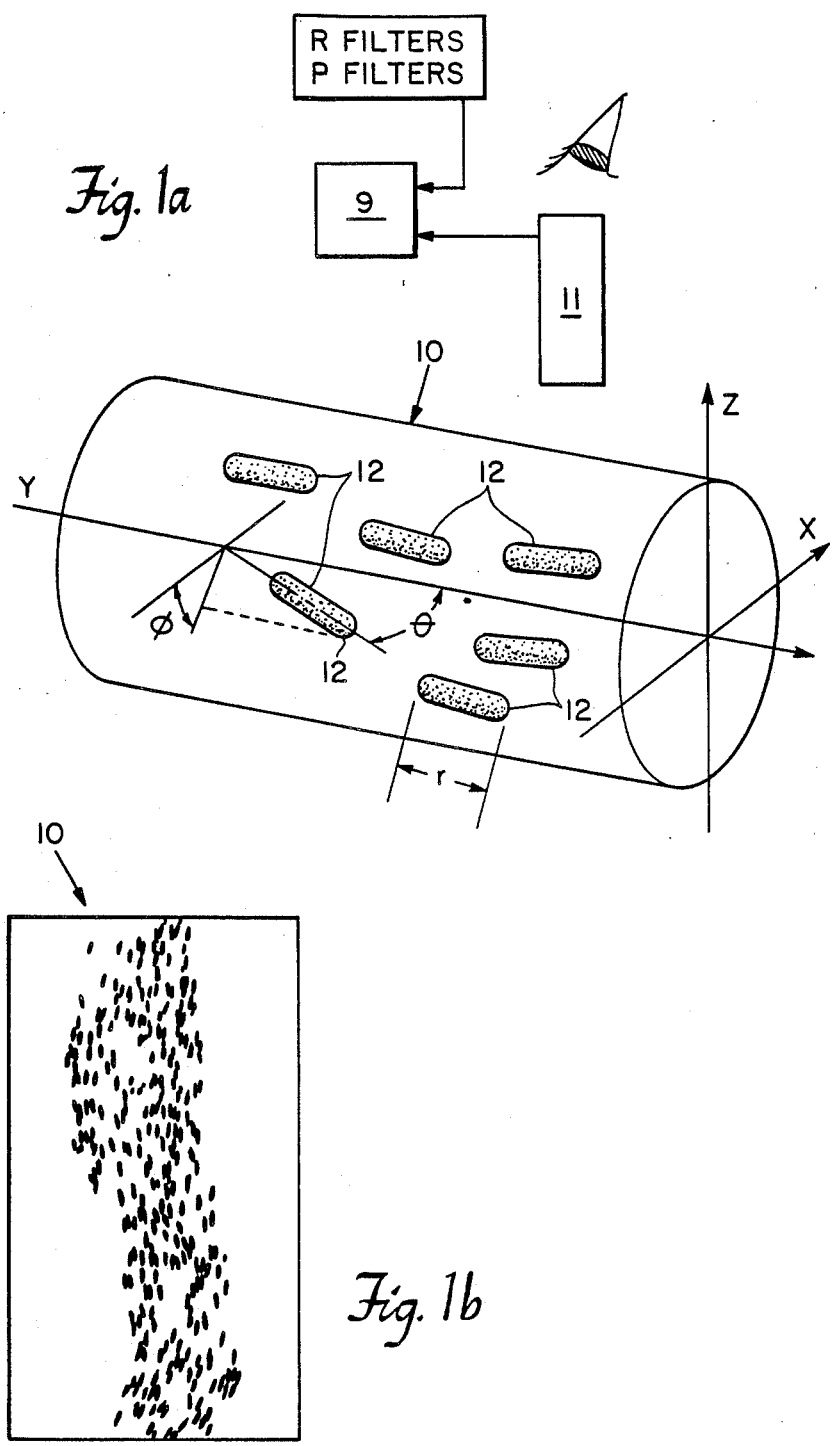
FIG. 1a is a schematic of the (x, y, z) coordinates of the fluorescence image of a cell with oblong bodies having spherical coordinates (r, $\theta$, $\phi$) in a system embodying the present invention.
FIG. 1b is a view of the fluorescence image through a microscope.

In the present invention, a three-dimensional fluorescence image of a smooth muscle cell containing oblong dense bodies is convolved with a series of overlapping spacial filters. The filter responses provide information which is used to determine the size and orientation of the oblong dense bodies in spherical coordinates (r, $\theta$, $\phi$) where r is a longitudinal dimension (length) of the oblong body, $\theta$ is the angle the oblong body makes with the longitudinal axis (y-axis) of the cell, and $\phi$ is the angle the projection of the oblong body makes with the x-axis of the cell. The axes of the cell and the spherical coordinates of interest are illustrated in FIG. 1a. The 3-D fluorescence image of the cell 10 in practice is viewed along the z-axis which provides a plan view of the cell lying on its longitudinal side. A view of the illuminated bodies 12 of FIG. 1a as seen through a microscope 11 is shown in FIG. 1b. Successive ones of such views are taken by refocusing the microscope 11 to record successive layers of the cell parallel to the X-Y plane. The successive layers are compiled to a 3-D view.

As used herein, a "filter" is a device which is used to separate a conglomeration of information in a field. Extraneous (unwanted) information is dispensed and information which is sought is retained and/or highlighted in the field. The result of a filtering operation is the retained (wanted) and/or highlighted information.

The filters in this particular application are designed with the following a priori knowledge:

(1) The bodies of interest are oblong (about one voxel wide and about 5 voxels long), and (2) The long axes of the oblong bodies lie within 30 degrees of the y-axis of the cell.

In the preferred embodiment, two different sequences of filters are defined, one for determining location and size (r), and a second for determining orientation ($\theta$, $\phi$) of the bodies. Each filter in a sequence is sensitive to a different range of values in the respective dimension of that sequence. The filters in each sequence are also tapered and overlapping, thus providing a unique pattern of responses for every body within the cell image to determine the respective dimension of that sequence as discussed later.

Figure 2A:
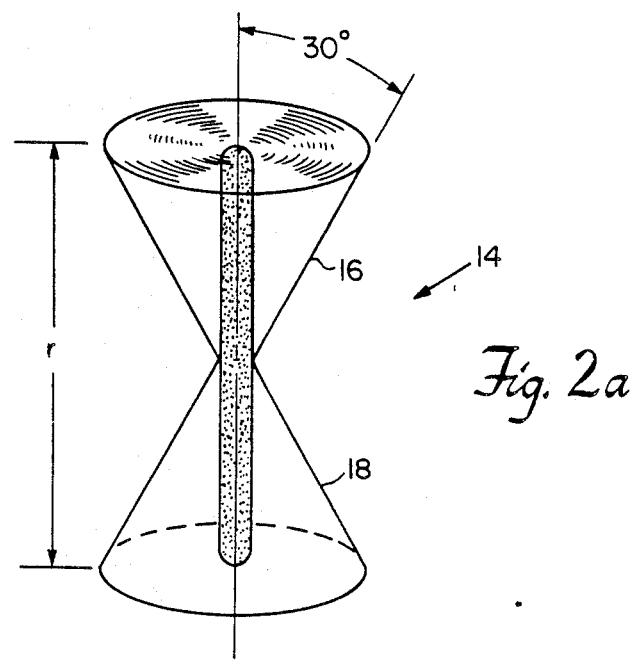
FIG. 2a is a schematic of the formation of an R-filter.
Figure 2B:
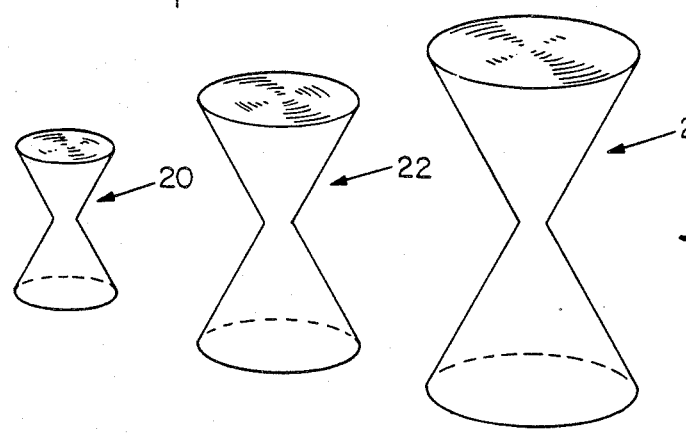
FIG. 2b is a side view of a series of R-filters which increase in length.

A series of R-filters measures the r dimension of the oblong bodies. Each R-filter represents a geometric solid of a different longitudinal size, r, rotated about its center to all possible values of and $\theta$. The geometric solid is chosen to most closely represent the shape of the oblong bodies of interest and hence in the preferred embodiment is a solid cylinder of width about one voxel and length r. The cylinder is rotated about its center 360° at angles of 0° through 30° with respect to its longitudinal axis. This forms a filter 14 which has two solid cones 16 and 18 positioned nose to nose with an overall length r as shown in FIG. 2a. Shown in FIG. 2b are cone shaped R-filters 20, 22, 24 with lengths r=3, 5, and 7 voxels respectively. Filter 14 of FIG. 2a represents the R-filter of length 9 voxels.

Figures 3A, 3B, 3C:
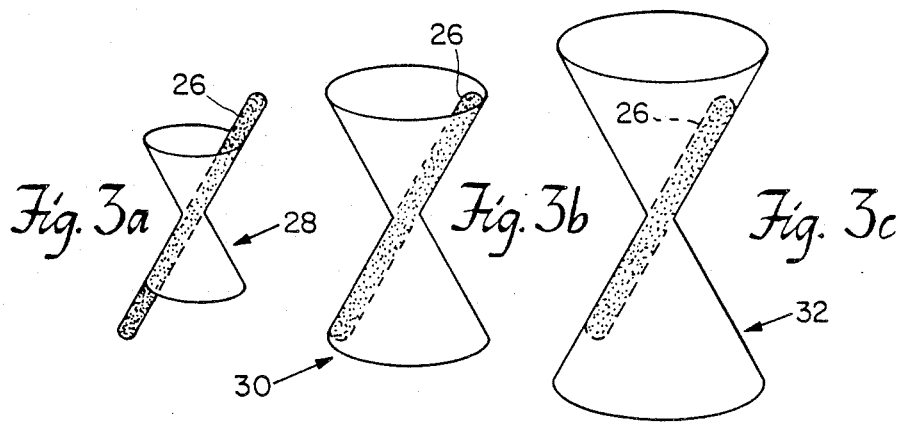
FIGS. 3a through 3c illustrate the convolution of the series of R-filters with an oblong body of the cell.

Beginning with the R-filter of length 3 and increasing through R-filter of length 9, each R-filter is independantly passed through or convolved with the 3-D fluorescense image of the muscle cell. When the R-filter intersects with an oblong body, the filter provides a response based on the intensity level of the light energy it captures from the illuminated oblong body. The intensity level is proportional to the volume of the intersection of the filter with the oblong body, and that intensity level is recorded for the position at the center of the filter. A response of the highest intensity level is generated when the center of a filter is centered over a body. Such an intersection is illustrated in FIGS. 3a-3c. A body 26 is independently convolved with, or intersected by, three different sized R-filters. In FIG. 3a, the smallest R-filter 28 yields a maximal reponse when body 26 fully intersects with the filter 28. In FIG. 3b, a longer R-filter 30 also is maximally intersected by the body and produces a response reflecting the highest intensity level of the filter 30. The largest R-filter 32 shown in FIG. 3c is not fully intersected by the body and produces a response which is less than its maximal response and equal to the response of R-filter 30. The maximal response of each filter provides a possible body center site. Further a filter may produce more than one maximal response for each body due to the presence of noise. Each such maximal response is considered a possible body center site.

In the preferred approach, initial locations of potential bodies are produced using the r=3 R-filter. The next larger R-filter (r=5) is then convolved with the image bodies at the locations found by the r=3 R-filter This R-filter may also generate its highest intensity level response if its center and opposite extremes are fully intersected by the oblong body as shown in FIG. 3b. The intensity level, and hence the response, increases for increasing lengths of R-filters until the R-filter exceeds the size of the oblong body at which point the response will remain constant between succeeding R-filters as illustrated in FIG. 3c. The estimate of body size is thus the length of the largest R-filter for which the filter response (intensity level) is significantly increasing.

The convolution of a filter with the image of the cell is accomplished by a point to point multiplication of the Fourier transform of the filter and the Fourier transform of the fluorescence image of the cell followed by an inverse Fourier transform of the product at 9 in FIG. 1a. At one or more positions within the filtered image, an energy extremum (maximum response) may occur and indicates a body. The final result is a set of responses for each body in the image. All R-filters are individually convolved with the image and produce a respective set of responses for each body detected in the cell. The equation representing such a convolution follows:

$$F^{-1}[F[i] \cdot F[f_k]] = g_k$$

where $F^{-1}$ is an inverse Fourier transform, F is the Fourier transform, i is the image $f_k$ is the kth filter and $g_k$ is the filtered image by the kth filter.

The positions of the energy extrema (maximum intensity responses) of each filter must be supported by a succeeding filter in order to validate that a body of interest has been located. A position is supported if a maximum in a succeeding filter is within ±2 voxels of the position. At this point each extremum is represented by the maxima responses for each filter in their respective location. An extramum is determined to be a potential body center when an increment in captured energy is in an amount which is proportional to the known increase in filter size between two succeeding filters. This is due to the oblong bodies of interest being uniform in density and other bodies of energy, not of interest, being of varying density. In the preferred embodiment, the shortest two R-filters (r=3 and 5) are used to verify the existance of an oblong body at the location defined by the r=5 R-filter, and the length of the body is given by the length of the last R-filter which produced an increasing filter response. The body center location is the location of the extrema of the R-filter chosen as the size of the body.

Figure 4A:
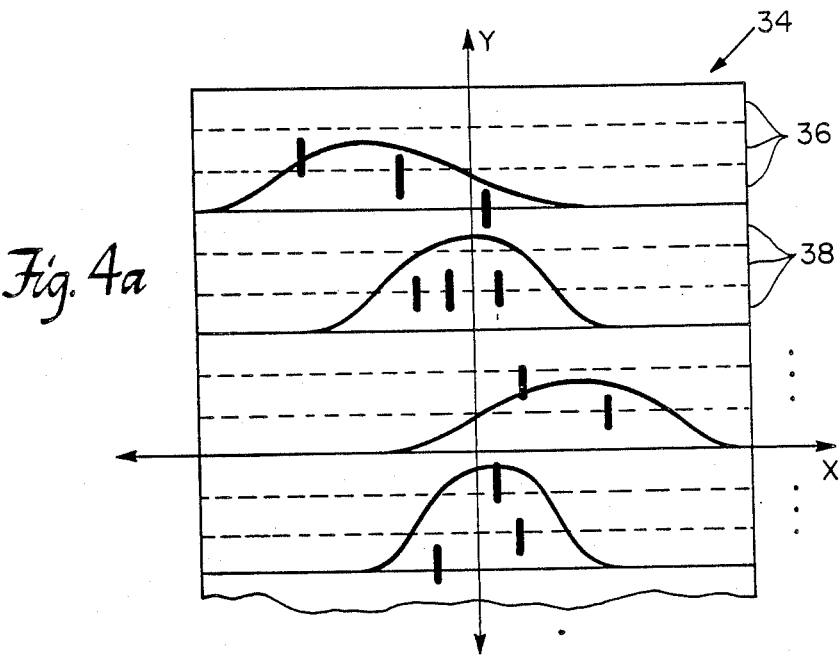
FIGS. 4a and 4b illustrate the use of a series of differential gaussian filters to determine boundaries of a cell within a fluorescence image.
Figure 4B:
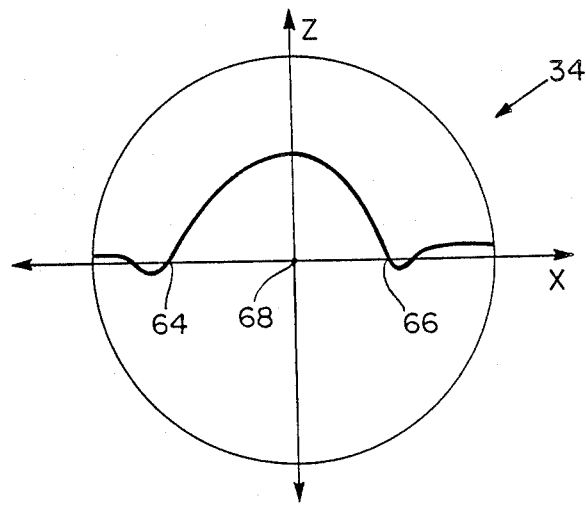

Often times the noise introduced by the fluorescence imaging system generates energy extrema outside of the boundaries of the cell. In order to separate these energy extrema from those of interest, the boundaries of the cell are defined within the image by the following process and as shown in FIGS. 4a and 4b.

Slices are made along the y-axis of the cell image 34 as shown by the dashed lines in FIG. 4. Using a sliding average of overlapping groups 36 of adjacent slices, smoothing is accomplished in the y-direction.

A series of 2-D gaussian difference filters is then generated. A gaussian filter is generated using the equation $$H(x,z) = \exp \frac{[-(x^2 + z^2)]}{2\sigma^2}$$

where σ is the standard deviation of the gaussian filter. Pairs of gaussian filters with different standard deviations are then subtracted yielding gaussian difference filters. Each gaussian difference filter is convolved with the smoothed image.

Each group is associated with a corresponding two dimensional gaussian curve of its energy intensity level with the respective group average intensity level being the peak of the curve in the middle slice of the group. This is graphically illustrated by the overlaying gaussian curves in FIG. 4a. A difference between gaussian curves of adjacent groups defines a series of two dimensional gaussian difference filters. Each gaussian difference filter is of a different width and is convolved with the image. When a gaussian difference filter is of the same width as the cell at a certain y position, a maximum value will be produced at the center of the cell for that y position and any resulting negative values will lie outside of the cell. Hence, a set of cell centers are produced at various positions along the y-axis.

Each cell center of the set of cell centers has an x and a z coordinant for a given y position. The x coordinates are filtered by a median filter of size five in the preferred embodiment. This provides a smoothing effect of the x coordinates. The same median filtering is done with the z coordinates. This provides a smoother transition in cell centers along the y-axis.

A one dimensional difference in gaussian curve is generated for each of the y positions in the smoothed image. The size (width) of the one dimensional gaussian difference curve matches that of the two dimensional gaussian difference curve for the respective y position. The one dimensional gaussian difference curve is placed across the x-axis at the respective y position to filter in the x direction. One such single dimension gaussian difference curve is shown in FIG. 4b in which the y-axis is through the page. Two zero crossings 64 and 66 are generated by the drop off points to the left and right of the peak of the gaussian difference curve along the x-axis. The distance of each zero crossing is measured from the cell center which is calculated from the 2-D gaussian difference filtering. The average of the two measurements defines the radius of the cell in the x and z direction for the respective y position since the cell is assumed to be symmetric.

The respective centers and radii for each y position thus determine the cell boundaries. The local energy extremas found by the R-filters which lay outside of the cell boundaries are then disregarded. Only the energy extremas which lay within the determined cell boundaries are of interest as being possible oblong bodies of α-actinin.

Upon filtering the image with the R-filters and determining the cell boundaries, the location of the oblong bodies and their lengths are obtained. The location of the body is the body center, hence the body centers are also known. The orientation of the oblong bodies is determined by a series of P-filters which are derived from the R-filters In the preferred embodiment, the R-filter of the respective length of the oblong body is divided into six equal sections about the longitudinal axis of its nose-to-nose cone shape. Corresponding opposite, or diagonal, sections across the nose to nose middle of the two cones form the P-filters, one of which is illustrated by the shaded sections 40 in FIG. 5. The corresponding sections defining a P-filter are symmetrical about the nose-to-nose middle and together represent the total area occupied by an oblong body at all possible declination angles with respect to the y-axis for a given range of azimuthal angles φ. A series of six P-filters are defined for each R-filter.

The P-filter for the azimuthal angle of 60° comprises the corresponding diagonal sections 42 one of which delineates the range of 30° to 90° with respect to the x-axis of FIG. 4. When a body is convolved with this filter and a maximal response is produced from the convolution, the body is determined to be oriented at an azimuthal angle of 60°. The P-filter for the azimuthal angle of 120° is defined by a second set of corresponding diagonal sections 44, one of which delineates the range of 90° to 150° with respect to the x-axis. When a body is convolved with this filter and a maximal response is produced, the body is determined to be oriented at an azimuthal angle of 120°. Likewise a third set of diagonal corresponding sections 46 delineates the range of 150° to 210° and defines the P-filter for the azimuthal angle of 180°. A fourth set of diagonal corresponding sections 48 delineates the range of 210° to 270° and defines the P-filter for the 240° azimuthal angle. A fifth set of corresponding diagonal sections 50 delineates the range of 270° to 330° and defines the 300° P-filter. A sixth set of sections 40 (shaded) delineates the range of 330° to 30° and defines the 0° P-filter.

When the P-filters are convolved with the cell image, a maximal response is generated when a substantial amount of the P-filter is intersected by a body. A substantial amount is an amount which is greater than that of the middle nose to nose area of the filter.

Figure 6:
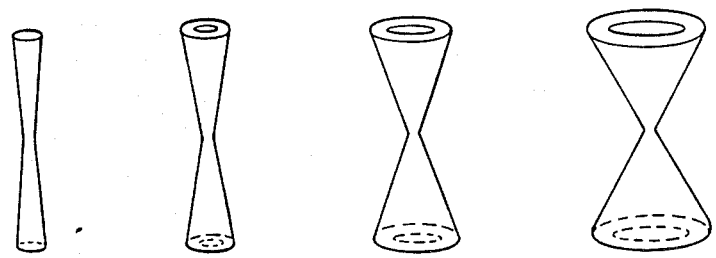
FIG. 6 is a side view of a series of T-filters.

In an earlier prototype of the system as disclosed in "Development and Application of a Three-Dimensional Artificial Visual System", from the Proceedings of the 9th Annual Symposium on Computer Applications in Medical Care, Nov. 10–13, 1985, IEEE Computer Society Press, a series of T-filters were used to determine the declination angle θ of each oblong body. The T-filters were hollow, nose to nose cones which represented an oblong body rotated about its center at a given angle. FIG. 6 is an illustration of a series of T-filters which increase in increments of 10° from θ=0° to θ=30°. The T-filters produced responses similar to that of the P-filters but for bodies with declination angles which were within a respective range of declination angles for each T-filter.

However, a distortion was found to exist in the angle due to the depth deficiency of the optics of the fluorescence imaging system. A more accurate computation of θ is obtained by the present system through a scheme which compensates for the depth distortion. As shown in a cross section of a distorted cell image 52 in FIG. 7, the optics of the fluorescence imaging system causes the depth (z-axis) of the cell image 52 to be shorter than the width (x-axis). As a result, the series of R, P and T filters operate in an image which has an elliptical cross section as illustrated in FIG. 7. No effect on the R-filtering was found and the effects during the P and T-filtering proved that θ is dependent on φ. At φ angles approaching 90° and 270°, a body overlapped the angles of more than two different T-filters making a φ measurement difficult and imprecise.

In the present invention each of the six P-filters of the R-filter of respective length of a body is independently convolved with or placed over the center of the oblong bodies of the respective length at the locations determined by the R-filter. The response of each P-filter to a body is a function of the amount of the filter which intersects with the oblong body. Each response for one body is represented as a vector from the origin in a generic x-z plane 86 with an orientation angle of the respective P-filter as illustrated by the dashed line vectors in FIG. 7b with the orientation angles of the 60°, 120°, 240° and 300° P-filters labelled in the figure. The length of each vector is a function of the level of the respective P-filter response (minimum to maximum response). The vector responses of the P-filters for each body are normalized by the respective R-filter response. For clarity of the illustration, the dashed line vectors of FIG. 7b assume no change in length due to normalization. The normalized vectors of the responses of the P-filters for each body are summed to provide a corresponding resultant vector 82 in respective x-z planes. The component of each resultant vector which lies along the depth or z-axis of the cell image is multiplied by a restoring factor to stretch the elliptical view 88 into a corresponding circular view 91 in the x-z plane. The restoring factor is a function of eccentricity dependant on r. The equation representing the restoring factor for a given r is stated in the following computer program.

The multiplication of the resultant vectors and respective restoring factors results in an adjusted resultant vector for each body. Each adjusted resultant vector has coordinates (x,z) in the respective generic x-z plane and forms an angle with the x-axis equal to the azimuthal angle of orientation of the oblong body. Vector 84 in FIG. 7b is the adjusted resultant vector of corresponding resultant vector 82. Further, the length of the adjusted resultant vector, defined as $\sqrt{x^2+z^2}$, is proportional to the declination angle $\theta$ and hence defines orientation of the body in the $\theta$ dimension. Hence, in the present invention the orientation angles of $\phi$ and $\theta$ are both defined by the series of P-filters alone.

It is appreciated that the angle of corresponding resultant vector 82 is a measurement of azimuthal angle $\phi$ of the body where no depth distortion is present. In the same respect, declination angle $\theta$ of the body is proportional to the length of resultant vector 82. Hence a measurement may be obtained with the P-filters as well as with a series of T-filters where no depth distortion in the image is present.

Figure 8A:
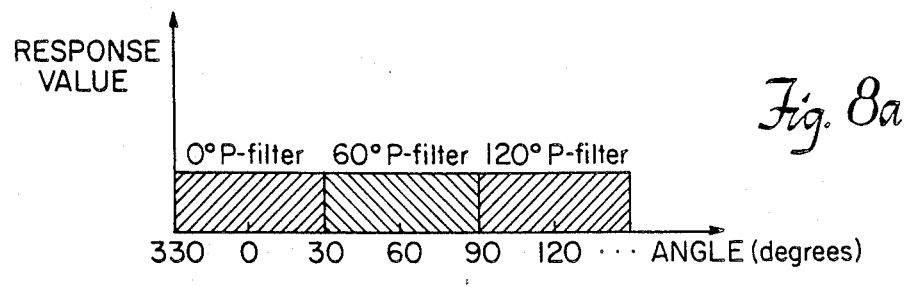
FIG. 8a is a graph of the responses of a series of adjacent, non-overlapping P-filters.
Figure 8B:
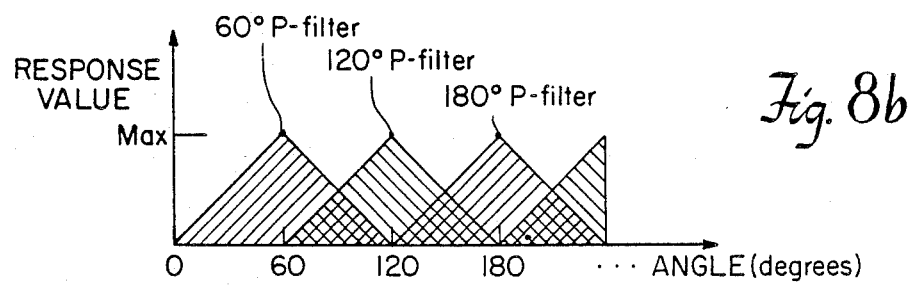
FIG. 8b is a graph of the responses of a series of overlapping P-filters.

Each P-filter as previously described has a single response for a range of angles through 60 degrees. In an improved embodiment, the P-filters each have a range of responses for the range of angles through which it detects. This contrast is illustrated in FIGS. 8a and 8b. In FIG. 8a, the response of the different P-filters is a horizontal line for the range of angles that each filter detects. Further the response of each P-filter has the same value as that of neighboring P-filters. Hence a line of zero slope graphs the responses of all the P-filters.

In FIG. 8b, the responses of each P-filter is an increasing and a decreasing line symmetrically positioned about a point which represents a maximum response. That is, the 120° P-filter has a maximum response for bodies detected at an azimuthal angle of 120°, and thus determines the $\phi$ dimension of that body to be equal to 120°. For bodies detected at an azimuthal angle between 60° and 120° and between 120° and 180° the 120° P-filter has a response which is less than maximum. Each of the less than maximum responses of the 120° P-filter for bodies at angles between 60° and 120° has an equal in value response for bodies at angles between 120° and 180°. That is, the 120° P-filter may have the same value response for a body at an angle between 60° and 120° as it does for a body at an angle between 120° and 180°. In odder to determine at which angle the body is oriented, the less than maximum response of the 120° P-filter corresponds to a less than maximum response of an adjacent filter for the same body. The corresponding responses of the two adjacent filters uniquely defines the azimuthal angle of orientation of the body.

Each successive P-filter likewise half overlaps adjacent filters to uniquely determine azimuthal angles of bodies which are not oriented at exact increments of 60°, and each filter has a maximum response at an exact increment of 60°. Further the end points of each filter overlap adjacent filters at increments of 60°. The endpoints have a response of zero such that the maximum response is the only response generated for a body at an azimuthal angle of an increment of 60°. Other fractions of overlap and response values for the endpoints are suitable.

Figure 8C:
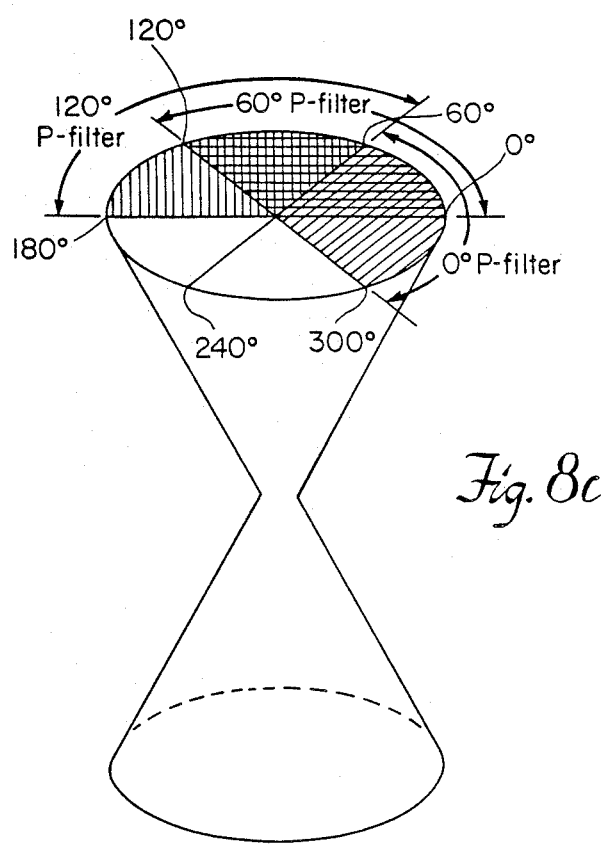
FIG. 8c is a plan view of a series of overlapping P-filters which are derived from the R-filters of FIG. 2b.

In order to form a series of P-filters which have half overlapping varying response levels, an R-filter is divided into six equal sections about its longitudinal axis as previously described. As shown in FIG. 8c, the 60° P-filter spans two sections corresponding to the azimuthal angles of 0° to 120° and half overlaps adjacent 0° and 120° P-filters respectively on its left and right sides. Similarly, the 120° P-filter spans the two sections corresponding to the azimuthal angles of 60° to 180° and half overlaps adjacent 180° and 60° P-filters on respective sides. The 180°, 240° and 300° P-filters are formed in a similar fashion about the R-filter and are not shown for clarity of the illustration.

Each of the P-filters has a dense central area in which the respective maximum response is generated. The density tapers from the central area to the side regions in which the less than maximum responses are generated. The edges of the P-filter have minimal density to generate negligible response where the adjacent filter generates a maximal response. This tapering of density is illustrated by the shading of the 120° P-filter. It is understood that the rest of the P-filters likewise have tapering density although not shown.

After filtering with the series of overlapping spacial R and P-filters, the position, length, and orientation angles $\theta$ and $\phi$ are obtained for each oblong body detected within the determined cell boundaries. This data is generated as the output of the computer program which accomplishes the foregoing filtering of the image with the R and P filters. A flow chart and description of one such computer program is provided in FIG. 9.

The program begins with routine Makcyl1 which calculates weighting functions used to define the filters. The weighting functions define cylinders which are later integrated to form the filters. The weighting functions for points in space (x, y, z) are defined as follows:

$$WR(x,y,z;r) = 1 \text{ if } R(x,y,z) \leq r$$
$$= \max(0, 1 - (R(x,y,z) - r))$$
$$\text{otherwise}$$

$$WT(x,y,z;t) = \max\left(0, 1 - \frac{/\theta(x,y,z) - t/}{10}\right)$$

$$WT1(x,y,z;t) = 1 \text{ if } \theta(x,y,z) \leq t$$
$$= WT(x,y,z;t) \text{ otherwise}$$

$$WP(x,y,z;p) = \max\left(0, 1 - \frac{/\theta(x,y,z) - p/}{60}\right)$$

where
$$R(x,y,z) = sqrt(x^2 + y^2 + z^2)$$
$$\theta(x,y,z) = 90 \text{ if } y = 0$$
$$= \arctan\left(\frac{sqrt(x^2+y^2)}{/y/}\right) \text{ otherwise}$$

and
$$(x,y,z) = 90 \text{ if } x = 0 \text{ and } z \geq 0,$$
$$= 270 \text{ if } x = 0 \text{ and } z < 0,$$
$$= \arctan(z/x) \text{ otherwise.}$$

The values for t and p are user inputted for each of 12 filters (6 P-filters and 6 T-filters). For each of the 12 filters, the weight functions for 2° increments of t and p are calculated. t varies from 0° to 60° and p varies from 0° to 360°. The results are stored in a file called Mackcyl1.Dat which lists the weight values at each t and p value for the 12 filters.

The weight values for each filter are inputted from Makcyl1.Dat into a buffer of routine Makcyl2. Routine Makcyl2 determines if the cylinder at each t and p value is needed to form a particular filter. If the cylinder is needed then a subroutine defines the cylindar by rotating the cylinder axis in space and precomputing the range of the cylinder in each dimension. A function is then used to calculated the response of a segment of a given cylinder at sample points (x,y,z). The respective filter intensity at each voxel (point) of the defined cylinder is determined by triple integration using Simpson's method. The filter intensity for each cylinder is stored in an array buffer 60.

A subroutine Outcyl creates 40 filter kernels from the stored information in array buffer 60 and the weighting functions of Makcyl1. The 40 filter kernels include four R-filter kernels (R1, R2, R3, R4) with r=3, 5, 7, 9, respectively; six T-series filter kernels (T1, T2, ..., T6) for each of r=5, 7, 9; and six P-series filter kernels (P1, P2, ..., P6) for each of r=5, 7, 9. The filter kernels are defined by the following relationships:

R1(x,y,z)=WR(x,y,z; 1.5) * WT1(x,y,z; 50)

R2(x,y,z)=WR(x,y,z; 2.5) * WT1(x,y,z; 50)

R3(x,y,z)=WR(x,y,z; 3.5) * WT1(x,y,z; 50)

R4(x,y,z)=WR(x,y,z; 4.5) * WT1(x,y,z; 50)

T1(x,y,z)=R4(x,y,z) * WT(x,y,z; 0)

T2(x,y,z)=R4(x,y,z) * WT(x,y,z; 10)

T3(x,y,z)=R4(x,y,z) * WT(x,y,z; 20)

T4(x,y,z)=R4(x,y,z) * WT(x,y,z; 30)

T5(x,y,z)=R4(x,y,z) * WT(x,y,z; 40)

T6(x,y,z)=R4(x,y,z) * WT(x,y,z; 50)

P1(x,y,z)=R4(x,y,z) * WP(x,y,z; 0)

P2(x,y,z)=R4(x,y,z) * WP(x,y,z; 60)

P3(x,y,z)=R4(x,y,z) * WP(x,y,z; 120)

P4(x,y,z)=R4(x,y,z) * WP(x,y,z; 180)

P5(x,y,z)=R4(x,y,z) * WP(x,y,z; 240)

P6(x,y,z)=R4(x,y,z) * WP(x,y,z; 300)

Makspher adds a rounded top and bottom piece to the filter kernels defined in Makcyl2. A sphere having diameter r corresponding to the length r of a filter is associated with the filter to provide the proper rounding feature.

Fsplice arranges the filter kernals in an order of use and stores the filter kernals in adjacent image areas of 15 voxels by 15 voxels by 15 voxels.

At this point, the filters are able to be used to analyze an image of interest. The routine Mapanal provides for this analysis using a convolution process. Mapanal begins by reading an image to be analyzed, and then reads the arranged filter kernals. The image and filter kernals are inputted to an array processor which forms the Fourier transform of the image and the Fourier transform of the filters.

The results of the array processor are used in subroutine Mapanal which filters the image using each of the filters and creates a data file of the filter results. The image is first filtered by the four R-filters, one filter at a time. The results are mapped onto a bit map which shows the location and estimate size of all maxima in the four R-filtered images. The bit map is examined for local relative extrema. The dense bodies found within the filtered image may have more than one extremum per body. However, a single extremum per body indicates a body center site. The bit map of the r=3 R-filter results is examined for these potential body center sites. The locations of extrema in the r=3 bit map are stored in a data buffer 62. These locations are examined in the r=5 bit map. If the value of the extremum in the r=5 bit map is significantly larger than the corresponding value in the r=3 bit map, then the extremum is a valid body point.

If a significant increase is found to exist between the values of the respective extremum of the r=3 and r=5 bit maps, then a significant increase is tested for the same extremum between the r=5 and r=7 bit maps. The validity of the extremum is similarly examined between the r=7 and r=9 bit map responses.

The increase in value of an extremum from the r=3 through the r=9 bit map is also tabulated for each extremum to determine body size. Location of a body center is determined by the (x,y,z) location of the extremum in the largest R-filter for which the response is significantly increasing. The size estimate, location and R-filter response values for each valid body are stored in data buffer 62.

The data is checked for redundant or conflicting information. Where conflicting information of a body exists, the information from the R-filter with the higher response is chosen.

The P-series filter responses for each valid extremum are calculated using Fourier transform techniques in the array processor. A series of P-filters for each R-filter of r=5, 7, 9 is convolved with the valid extrema of the image. Each P-filter of a certain series dependant on r has a maximal response to a different 60° range of values between 0° and 360°. The P-filter responses for each extrema are stored in data buffer 62 according to the respective R-filter (r=5, 7, 9).

Each extrema is similarly processed by the T-series filters for each r=5, 7, 9. The series of T-filters for each r comprise one T-filter with $\theta=0°$ through 10°, a second T-filter with $\theta=10°$ through 20° and a third T-filter with $\theta=20°$ through 30°. The results are stored in data buffer 62 according to the respective r. The data buffer now contains values for r, $\theta$, $\phi$, of each body in the image.

Project0 calculates a restoring (eccentricity) factor and a scale factor for each value of r for r=5, 7, 9. A set of 61 model bodies for each r is defined with orientation ($\theta$, $\phi$) where $\theta=5°$, 10°, 15°, 20°, 25° and $\phi=0°$, 30°, 60°, 90°, 120°, 150°, 180°, 210°, 240°, 270°, 300°, 330°, and the 61st model body represents $\theta=0°$ for all $\phi$ values. The responses of measured bodies stored in data buffer 62 are assigned to model bodies of respective r and $\phi$. The P-filter responses are divided by the respective R-filter response to normalize the P-filter responses. The normalized P-filter responses are associated with a vector in polar coordinates. Each normalized response is then converted to rectangular coordinates (x,y). The vector sum of the vectors of each model body provides the circular average of the P-filter responses for each model body. This is mathematically stated by the following equations.

$$x \text{ coordinate of a model body} = \sum_{i=1}^{6} \bar{x}_i \frac{P_i(r)}{R(r)}$$

$$\text{and } y \text{ coordinate of a model body} = \sum_{i=1}^{6} \bar{y}_i \frac{P_i(r)}{R(r)}$$

where R(r) is the R-filter response of an R-filter with length r; P(r) is the measured P-filter response of one of the serial P-filters of the respective R-filter with length r in which $P_1$ denotes the P-filter of that series with a maximal response to $\bar{\phi}=0°$ through 60°, $P_2$ denotes the P-filter with a maximal response to $\bar{\phi}=60°$ through 120°, $P_3$ denotes the P-filter of $\bar{\phi}=120°-180°$, $P_4$ denotes the P-filter of $\bar{\phi}=180°-240°$, $P_5$ denotes the P-filter of $\bar{\phi}=240°-300°$, and $P_6$ denotes the P-filter of $\bar{\phi}=300°-360°$; and where $\bar{\phi}=\bar{x}\cos\bar{\phi}+\bar{y}\sin\bar{\phi}$.

The restoring factor, E(r), for each value of r for r=5,7,9 for converting the elliptical feature plane into a circular feature plane is then computed as $$E(r) = \frac{\sqrt{\sum_{j=1}^{60} x_j(r)^2}}{\sqrt{\sum_{j=1}^{60} y_j(r)^2}}$$

where x(r) and y(r) are the (x,y) coordinates of each of the first 60 model bodies of a given length r. The 61st model body with $\phi=0°$ is ommitted because it coincides with the center of the view plane.

The scaling factor, S(r), as a function of r is computed by the equation $$S(r) = \frac{\sum_{i=1}^{60} \sqrt{x_i'(r)^2 + y_i'(r)^2}}{60 \cdot K}$$

where y'(r)=E(r) * y(r), and K is a constant derived from the model bodies. K=15 in the preferred embodiment.

Project1 applies the restoring factor and scaling factor from Project0 to the measured responses which are stored in data buffer 62. The measured P-filter responses are normalized by a respective R-filter response and associated with respective vectors in polar coordinates. The polar coordinates are then converted into rectangular coordinates. A circular average of the normalized P-filter responses of each body is computed from a vector sum of the vectors for that body. The restoring factor of the respective r value, which is supplied by Project0, defines a corrected y coordinate value of y'=E(r) * y for each measured body. Hence, each body is associated with coordinates (x,y'). The orientation ($\theta$, $\phi$) of each body is then calculated by the following relationships:

$$\phi = \arctan(y'/x), \text{ and}$$

$$\theta = \sqrt{x^2 + y'^2} * S(r)$$

where S(r) is the scaling factor of the respective r as supplied by Project0.

The outcome of Project1 is thus a list of the r, $\theta$, $\phi$ values for each detected oblong body within the cell image.

While the invention has been particularly shown and described with reference to a preferred embodiment thereof, it will be understood by those skilled in the art that various changes in form and details may be made therein wihtout departing from the spirit and scope of the invention as defined by the appended claims. For example, the invention has application to location of image bodies other than fluorescent images in cells.

Furthermore, it is understood that bodies of other shapes are similarly located by overlapping spacial filters which simmulate the respective shape of the bodies of interest. For example, spherical shape bodies may be located by convolving them with a series of spherical R-filters which increase in diameter. The response of each spherical R-filter is proportional to the volume of the filter which is intersected by a body. A maximum response is generated when the volume of a filter is completely intersected. Bodies of interest are located by two filters responding with increasing energy intensity levels (maximum responses) relative to their respective sizes. The size of each body of interest is estimated by the size of the largest spherical R-filter for which the filter response (energy intensity level) is significantly increasing as previously discussed in the preferred R-filters. Because the bodies are spherical, orientation is not unique and no P-filters are needed.

Also it is understood that a series of overlapping spacial filters of varying density can be applied to the dimensions other than $\phi$. For example, a series of overlapping T-filters would be possible if the optic resolution of depth were not a problem. In that case, a first T-filter would span a range of declination angles of 0° to 10° and would have a maximum response at 5°. The filter would have a dense ring about the 5° declination angle and a tapering of density toward the 0° and 10° angles where a negligeble response is generated. This is illustrate by the partially shaded top surface of the cone shaped filter of FIG. 10a where heavier shading represents greater density. A second T-filter would span a range of declination angles of 5° to 15° with a maximum response at 10° and hence a dense ring about the 10° angle as shown in FIG. 10. The second T-filter has minimal density, and hence a negligelble response, at its 5° and 15° edges. As shown in FIG. 10c, a third T-filter would similarly span angles of 10° to 20° and have a maximum response at a dense ring about the 15° declination angle; and so forth.

We claim:

1. Apparatus for locating positions and measuring sizes of bodies in a 3-D fluorescense image, comprising:
   spatial filter means comprised of a plurality of spacial filters for locating bodies of different sizes within a predetermined range of sizes, each spatial filter for locating bodies of one predetermined size, different spatial filters for locating bodies of different predetermined sizes; and
   convolution means for convolving each spacial filter with the image to locate bodies of at least the respective predetermined size, convolution responses of successive filters providing a size measurement of a body, the respective predetermined size of a largest filter providing an increasing convolution response to the body determining size measurement of the body and determining size of spacial filter for providing orientation of the body.

2. Apparatus as claimed in claim 1 wherein said each spacial filter is a sum of all rotations of a rod about its center through a predetermined range of orientations, a length of each spacial filter being of a different predetermined size.

3. Apparatus as claimed in claim 1 wherein said spacial filters locate elongated molecular bodies in an image of a cell.

4. Apparatus as claimed in claim 1 wherein each of said spacial filters is a set of two cones positioned nose to nose for detecting elongated bodies within a predetermined orientation about a longitudinal axis of the two cones, the lengths of the filters along the longitudinal axis being of different predetermined sizes.

5. Apparatus as claimed in claim 1 wherein existence of a body is verified by both (i) an increase in response between succeeding spacial filters which locate bodies of different predetermined sizes, and (ii) the increase between respective predetermined sizes associated with said spatial filters, the increase in response being proportional to the increase between respective predetermined sizes.

6. Apparatus as claimed in claim 1 further comprising filter means for determining outer limits of the positions of the bodies.

7. Apparatus as claimed in claim 6 wherein said filter means provide a difference in gaussian distribution by locations of bodies located by the spacial filters.

8. Spacial filtering apparatus for measuring a spacial characteristic of bodies of an image comprising:
   a series of spacial filters, the filters being designed such that successive filters provide a principal convolution response to bodies of predetermined incremental values of the spacial characteristic and also provide a unique convolution response to other bodies over a continuous range of values of the spacial characteristic, the ranges of successive filters overlapping; and
   convolving means for convolving the image of a body with the series of filters and for measuring the spacial characteristic of the body from successive filters.

9. Spacial filtering apparatus as claimed in claim 8 wherein each spacial filter comprises diagonally corresponding pie shaped segments of a set of two cones positioned nose to nose, the pie shaped segments having a dense area which is responsive to bodies of an incremental value of the spacial characteristics and a remaining area which is decreasing in density and responsive to bodies over a range of values above and below the incrmental value.

10. Spacial filtering apparatus as claimed in claim 9 wherein each set of pie shaped segments of each respective spacial filter is responsive to bodies having an azimuthal angle within a different range of angles over a span of 120° and provides a pricipal response to bodies having azimuthal angles of a multiple of 60°.

11. Spacial filtering apparatus as claimed in claim 8 wherein a first and second spacial characteristic are determined from one filter.

12. Spacial filtering apparatus as claimed in claim 11 wherein a declination angle is determined from a filter for an azimuthal angle.

13. Apparatus for measuring orientation angles in spherical coordinates $\theta$ and $\phi$ of a body with known location and size in an image comprising:
   a series of spacial filters for determining azimuthal angle $\phi$ of a body in a convolution process, the filters designed such that each successive filter provides a vector response to bodies within a different range of azimuthal angles, the ranges of the filters collectively covering a continuum of angles; and
   convolution means for convolving an image of a body with the series of filters to provide a respective series of vector responses within the different ranges of azimuthal angles, a sum of the vectors providing measurement values of both orientation angles $\theta$ and $\phi$ of the body.

14. Apparatus as claimed in claim 13 wherein $\phi$ equals the angle of a resultant vector of the sum of the vectors and $\theta$ is proportional to the length of the resultant vector.

15. Apparatus as claimed in claim 13 wherein the vectors representing the responses which have a component along a distorted axis of the image are corrected with respect to the distortion.

16. Apparatus as claimed in claim 13 wherein the series of spacial filters are designed such that successive filters provide a principal vector response to bodies of incremental azimuthal angles but provide a corresponding vector response to other bodies over a range of azimuthal angles above and below the incremental azimuthal angles, the ranges of successive filters overlapping such that corresponding responses uniquely determine an azimuthal angle.

17. Apparatus for determining spacial boundaries of an image of a cell within which bodies are determined to be located comprising:
   a series of 2-D differential guassian filters for determining central axis of a cell image; and
   for each of a series of equidistant transverse sections of the cell image, a series of 1-D differential gaussian filters for generating a differential gaussian curve having a peak with a base between zero crossings, the distance across the base of the peak between the zero crossings determining radius of the cell image.

18. A method of locating positions and measuring sizes of bodies in a 3-D fluorescense image, the steps comprising:

convolving one at a time with the image a plurality of spacial filters, the spacial filters being designed such that bodies of different sizes within a predetermined range of sizes are located, each spatial filter for locating bodies of a size that is different than that of the other spatial filters;

determining point locations and measuring sizes of the bodies from each filter response of the convolution, each filter locating bodies of at least the respective predetermined size and successive filters providing a size measurement of a located body, the respective size of a largest filter providing an increasing response to the located body determining a size measurement of the body; and forming a series of filters from the filters from which size measurements of located bodies are determined, the formed series of filters for determining orientation of the respective bodies.

19. A method as claimed in claim 18 wherein the image is a cell image and the method further comprises the step of:

determining boundaries within which the bodies lie in the cell image with a series of differential guassian filters for providing a central axis and radial dimensions of the cell image.

20. A method as claimed in claim 18 wherein the step of determining the location of bodies includes verifying existence of each by detecting a proportional increase in response between succeeding filters to the increase between respective predetermined sizes associated with the spacial filters.

21. A method of providing a measurement value for a spacial characteristic of bodies in an image, the steps comprising:

convolving a series of spacial filters for locating the bodies, the filters being designed such that successive filters provide a principal response to bodies of incremental values of the spacial characteristic and also provide a unique convolution response to other bodies over a continuous range of values of the spacial characteristic above and below the incremental values, the ranges of successive filters overlapping; and determining a measurement value for the spacial characteristic of the bodies from the responses of the successive filters, the convolution responses of successive filters determining unique values of the spacial characteristic.

22. A method as claimed in claim 21 wherein the step of determining a measurement value for the spacial characteristic of the bodies includes providing measurement values of at least two different spacial characteristics from same convolution responses of the successive filters.

* * * * *